United States Patent
Marks De Chabris et al.

(10) Patent No.: US 8,108,294 B2
(45) Date of Patent: *Jan. 31, 2012

(54) ORDER MATCHING SYSTEM

(75) Inventors: Gloriana Marks De Chabris, Toronto (CA); Andrew Marks De Chabris, Toronto (CA)

(73) Assignee: Intellectual Ventures Fund 67 LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/719,537

(22) Filed: Mar. 8, 2010

(65) Prior Publication Data

US 2010/0169238 A1 Jul. 1, 2010

Related U.S. Application Data

(63) Continuation of application No. 11/532,660, filed on Sep. 18, 2006, now abandoned, which is a continuation of application No. 09/770,108, filed on Jan. 25, 2001, now Pat. No. 7,110,975.

(60) Provisional application No. 60/177,649, filed on Jan. 27, 2000.

(51) Int. Cl.
*G06Q 40/00* (2006.01)

(52) U.S. Cl. .......... 705/37; 705/35; 705/36 R; 705/36 T
(58) Field of Classification Search ............. 705/37, 705/36, 35, 36 R, 36 T
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 4,412,287 A | 10/1983 | Braddock, III | |
| 4,486,853 A | 12/1984 | Parsons | |
| 4,674,044 A | 6/1987 | Kalmus et al. | |
| 4,903,201 A | 2/1990 | Wagner | |
| 5,689,652 A | 11/1997 | Lupien et al. | |
| 5,727,165 A | 3/1998 | Ordish et al. | |
| 5,794,207 A | 8/1998 | Walker et al. | |
| 5,802,499 A | 9/1998 | Sampson et al. | |
| 5,835,896 A | 11/1998 | Fisher et al. | |
| 5,845,265 A | 12/1998 | Woolston et al. | |

(Continued)

FOREIGN PATENT DOCUMENTS

WO 00/21013 A1 4/2000

(Continued)

OTHER PUBLICATIONS

Michael S Sackheim. (1999). US to allow access to global electronic futures trading. International Financial Law Review, 18(5), 17-20. Retrieved Sep. 16, 2011.*

(Continued)

*Primary Examiner* — Narayanswamy Subramanian
*Assistant Examiner* — Kito R Robinson
(74) *Attorney, Agent, or Firm* — Turocy & Watson, LLP

(57) ABSTRACT

Scheduling execution of orders is provided. An order system can enable users to define and modify buy/sell order schedules. The order system can use the order schedules and associated evaluation heuristics to evaluate and update order characteristics such as price and quantity based on user-specified criteria. An order manager, utilizing a schedule supervisor server, can maintain a database containing order schedules and order status information, and execute variable evaluations based on the order schedules and associated evaluation heuristics. A transaction supervisor server can monitor the status of order fills and to update the database periodically.

28 Claims, 7 Drawing Sheets

U.S. PATENT DOCUMENTS

| | | | |
|---|---|---|---|
| 5,845,266 A | 12/1998 | Lupien et al. | |
| 5,873,071 A | 2/1999 | Ferstenberg et al. | |
| 5,890,138 A * | 3/1999 | Godin et al. | 705/26.3 |
| 5,924,082 A | 7/1999 | Silverman et al. | |
| 5,937,393 A | 8/1999 | O'Leary et al. | |
| 5,948,040 A | 9/1999 | DeLorme et al. | |
| 5,950,176 A | 9/1999 | Keiser et al. | |
| 5,960,406 A | 9/1999 | Rasansky et al. | |
| 5,960,411 A | 9/1999 | Hartman et al. | |
| 6,012,046 A | 1/2000 | Lupien et al. | |
| 6,023,686 A | 2/2000 | Brown | |
| 6,119,101 A | 9/2000 | Peckover | |
| 6,278,982 B1 | 8/2001 | Korhammer et al. | |
| 6,311,144 B1 | 10/2001 | Abu El Ata | |
| 6,408,282 B1 | 6/2002 | Buist | |
| 6,532,217 B1 | 3/2003 | Alkhatib et al. | |
| 6,629,082 B1 * | 9/2003 | Hambrecht et al. | 705/36 R |
| 7,110,975 B2 | 9/2006 | de Chabris | |
| 2001/0044767 A1 * | 11/2001 | Madoff et al. | 705/37 |

FOREIGN PATENT DOCUMENTS

| | | |
|---|---|---|
| WO | 00/26834 A2 | 5/2000 |
| WO | 00/57307 A1 | 9/2000 |
| WO | 01/04817 A1 | 1/2001 |

OTHER PUBLICATIONS

OA mailed Jan. 22, 2009 for U.S. Appl. No. 11/532,660, 10 pages.
OA mailed Feb. 11, 2003 for U.S. Appl. No. 09/770,108, 7 pages.
OA mailed Mar. 11, 2005 for U.S. Appl. No. 09/770,108, 6 pages.
OA mailed May 6, 2008 for U.S. Appl. No. 11/532,660, 16 pages.
OA mailed May 11, 2004 for U.S. Appl. No. 09/770,108, 9 pages.
OA mailed Aug. 23, 2005 for U.S. Appl. No. 09/770,108, 9 pages.
OA mailed Sep. 8, 2009 for U.S. Appl. No. 11/532,660, 13 pages.
OA mailed Nov. 10, 2003 for U.S. Appl. No. 09/770,108, 7 pages.
OA mailed May 22, 2002 for U.S. Appl. No. 09/770,108, 5 pages.

* cited by examiner

ORDER MATCHING SYSTEM

This application is a continuation of U.S. patent application Ser. No. 11/532,660, filed Sep. 18, 2006, which is a continuation of U.S. patent application Ser. No. 09/770,108, filed Jan. 25, 2001, which claims priority from U.S. Provisional Application No. 60/177,649, filed Jan. 27, 2000.

FIELD OF THE INVENTION

This invention relates generally to computer based trading and auction systems, and more particularly to an improved order matching system.

BACKGROUND OF THE INVENTION

Traders and investors in securities, commodities and other items send their buy and sell orders to centralized exchanges seeking the best combination of publicly disclosed price and depth of liquidity. However, liquidity in many markets appears sporadically due to the fact that buy orders and sell orders do not necessarily arrive at the same times, which causes prices to fluctuate in an ongoing search for price-liquidity equilibrium. Also, any sizable order arriving in a centralized market has the potential to change the equilibrium by indicating to participants the presence of a new contender for liquidity and as a result it motivates participants to change their order prices.

Participants who attempt to find liquidity in such an environment tend to use multiple liquidity destinations. Liquidity destinations are generally defined as any kind of transaction marketplaces such as "upstairs" block trading desks, security exchanges, auction forums, and electronic communication networks. Participants also divide their orders over time and by destination into smaller sized pieces to disguise their true size.

Order matching systems are currently offered by various companies and exchanges in association with trading of various trading and financial related instruments to overcome this type of inherent phenomenon in centralized financial securities markets. Order matching systems manage buy/sell orders to find the best combination of publicly disclosed price and depth of liquidity.

Order matching systems collect buy and sell orders without disclosing to the marketplace the price, quantity, or type in order to avoid impacting the price in the marketplace. As a consequence, numerous large orders can be entered into an order matching system without fear of degrading price performance. One disadvantage inherent in order matching systems is that orders may be committed to a destination that does not happen to attract the appropriate liquidity at the right moment, while liquidity is available at other destinations. Further, the increasing number of exchange destinations reduces the prospects of success in the search for liquidity.

One example of an order matching system is Instinet, owned by Reuters which operates an electronic trading system that allows parties to enter bids and offers electronically in an anonymous fashion as an alternative to the direct human-to-human negotiation of orders in the upstairs market or on the trading floors. Instinet subscribers can respond to an "order" entered into the system either by matching a displayed price or by making a counter bid or offer that is transmitted electronically to the counterparties. Instinet executes matches on a periodic basis, anywhere from several times a day to hourly, after which the order is cancelled or carried forward to the next match.

Another automated trading system is disclosed in U.S. Pat. No. 4,674,044 (Kalmus et al.), owned by Merrill Lynch. This system matches security buy/sell orders. Orders are qualified for execution by comparing the specifics of an order against predetermined stored parameters including the operative bid and asked prices, the amount of stock available for customer purchase or sale, and maximum single order size. Once qualified, the order is executed and the appropriate parameters updated.

The Optimark system owned by OptiMark Technologies, Inc. as described in U.S. Pat. No. 5,845,266 to Lupien et al. performs continuous matching by cycling through the order book every minute or two. This system allows participants to enter satisfaction density profiles for each order which can incorporate factors such as price, quantity, eligibility and urgency which can be associated with order satisfaction profiles as a whole or with each individual profile coordinate value.

The use of such automated systems within the financial instrument marketplace has increased the proliferation of liquidity destinations. This in turn has actually made the job of those responsible for executing transactions more labour intensive and time consuming as increased monitoring time is required to utilize these alternatives to the regular centralized exchanges. For example, traders are typically given a quantity and a price range in which they are expected to transact as well as a time frame in which to accomplish this. As a result, there is a tendency for traders to executing trades, while maintaining within the user imposed price and quantity ranges, at less desirable order prices and quantities as the user imposed deadline for trading approaches.

Accordingly, there is a need for a order matching system which efficiently manages orders for users between different liquidity destinations, which provides users with the ability to enter orders that reflect their specific order preferences over a wide set of market and external criteria, which allows users to specify in advance how order characteristics should be determined during the course of trading, and which minimizes the monitoring time requirements associated with the execution of order transactions.

SUMMARY OF THE PRESENT INVENTION a) In accordance with an aspect of the present invention there is provided a method of coordinating and timing orders using an order manager operating on a computer, the order manager capable of communicating with a transaction destination over a communication network, the method comprising the steps of:

receiving an order definition at the order manager, the order definition defined by an evaluation heuristic identifying a plurality of transaction instances, each said transaction instance identifying an order, the transaction destination and a predefined time instant for execution of the order with the transaction destination;

at the predefined time instant associated with one of the transaction instances, transmitting over the communications network to the associated transaction destination an order message identifying the associated order; the predefined time instant, the order and the transaction destination of the order message being determined in accordance with the evaluation heuristic;

receiving from the associated transaction destination over the communications network a completion message identifying a completion status of the order at the transmitted transaction destination; and repeating steps the previous two steps in accordance with the completion status and the evaluation heuristic for coordinating and timing the order.

In accordance with a further aspect of the invention there is provided a system for coordinating and timing orders to be executed by a computer in communication with a communication network, the order coordination and timing system comprising:

data storage for storing an order definition defined with an evaluation heuristic, the evaluation heuristic identifying a plurality of transaction instances, each said transaction instance identifying an order, a transaction destination and a predefined time instant for execution of the order with the transaction destination;

schedule supervisor software in communication with the data storage for transmitting, at the predefined time instant associated with one of the transaction instances, an order message to the associated transaction destination over the communications network, the order message identifying the one transaction instance; the predefined time instant, the order and the transaction destination of the order message being determined in accordance with the evaluation heuristic to coordinate and time the order; and transaction supervisor software in communication with the data storage for receiving over the communications network a completion message identifying a completion status of the order at the transmitted transaction destination, and for updating the order schedule in the data storage in accordance with the completion status.

BRIEF DESCRIPTION OF THE DRAWING FIGURES

For a better understanding of the present invention and to show more clearly how it may be carried into effect, reference will now be made, by way of example, to the accompanying drawings, which show a preferred embodiment of the present invention and in which.

DESCRIPTION OF THE PREFERRED EMBODIMENT

Figure 1:
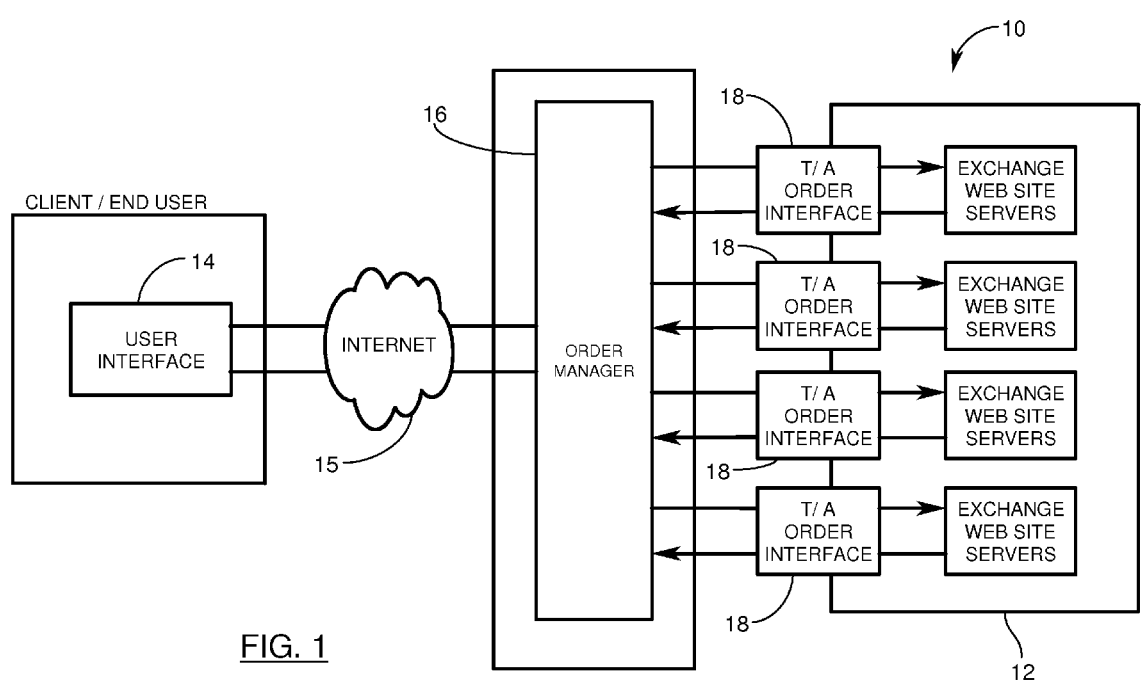
FIG. 1 is a schematic drawing of a preferred embodiment of the present invention.

Reference is first made to FIG. 1, which shows an order matching system 10 made in accordance with a preferred embodiment of the invention. System 10 allows users to engage in transactions by defining order schedules and associated evaluation heuristics for execution within transaction destinations 12. The term transaction should be understood not be limited to security transactions, but can also include auction transactions as well as any other type of conventionally recognized market transaction (e.g. airline ticket bookings). Accordingly, the term transaction destination should not be limited to only security markets but can include auction destinations as well as any other general liquidity destination. The order schedule allows a user to specify various buy/sell instructions as a function of user selected criteria and/or variables. System 10 comprises a user interface 14 which can be connected over the internet 15 to the transaction destinations 12 through a schedule manager 16, and a transaction order interface 18.

User interface 14 provides users with the ability to obtain information concerning the status of their order account as well as with the ability to enter or modify their order schedules. Specifically, a user will connect through user interface 14 to a web server which hosts schedule manager 16. User interface 14 is implemented by a conventionally known browser based applet on a communications system based on direct socket connections. Preferably the applet is implemented in the Java programming environment, to maximize compatibility with transaction destination 12 and web browser versions. The network protocol for the socket communication can be based on TCP/IP and security and any communication firewalls can be provided using Secure Socket Layer (SSL) as is conventionally known.

Figure 2:
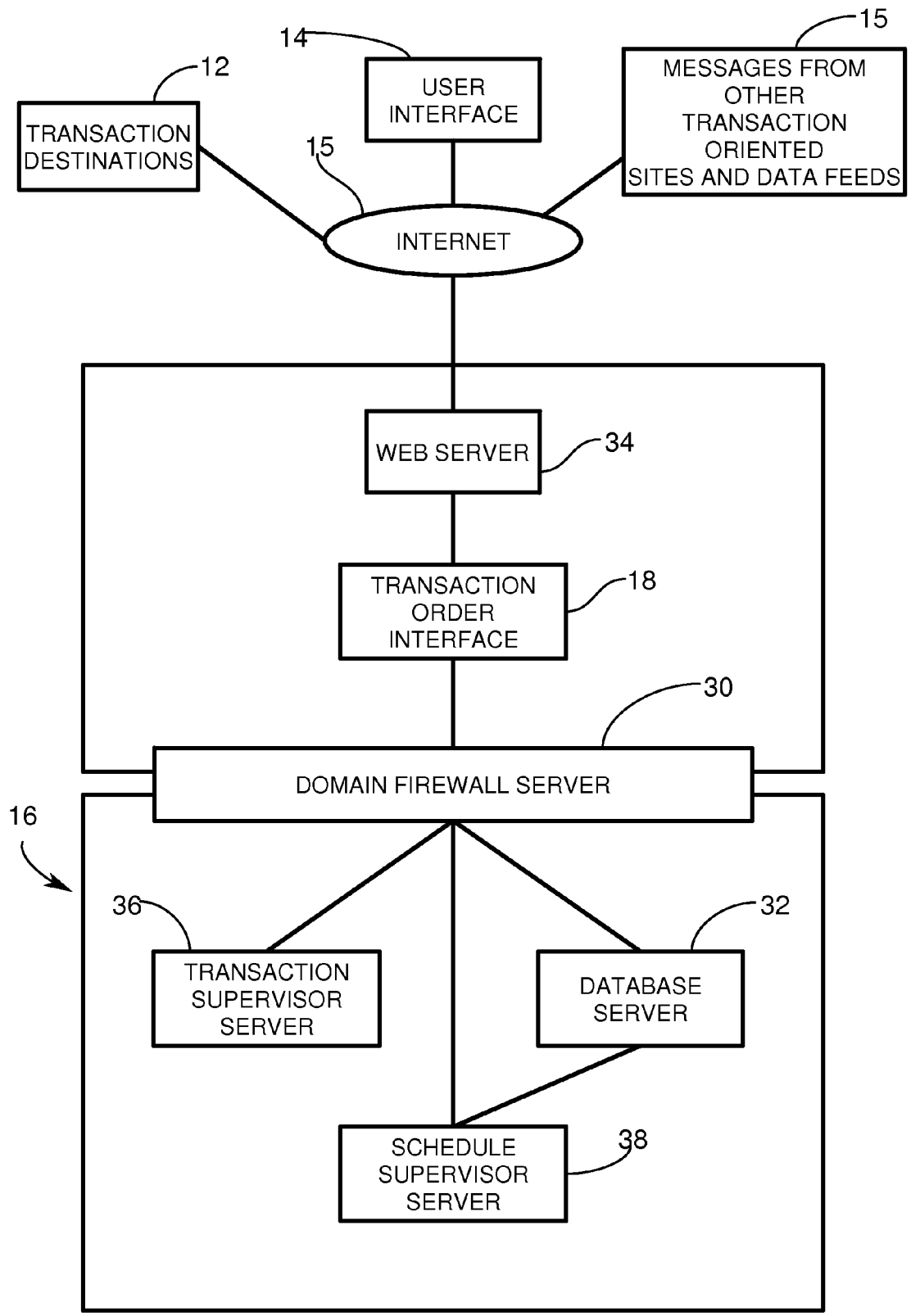
FIG. 2 is a more detailed schematic drawing of the basic hardware and software components of the embodiment of the present invention shown in FIG. 1.

FIG. 2 shows a more detailed view of order manager 16 of system 10. Order manager 16 is implemented using a conventional distributed server architecture which comprises a domain firewall server 30, a database server 32, a web server 34, a transaction supervisor server 36, and a schedule supervisor server 38. All of these servers are run using a conventional operating system such as Windows NT. Web server 34 utilizes Internet Information Server and database server 32 is implemented in Microsoft SQL 7.0 running on a Pentium III machine. While it is preferred to use a distributed server architecture to implement order manager 16 for efficient allocation of operations on different servers to handle high traffic volume, it should be understood that it would also be possible to implement all operations of order manager 16 using a single server. The transaction supervisor server 36 contains a monitoring program which is based on CORBA's Object Transaction Service supported by ORBS (Object Request Broker). Security can be provided at the browser level using either the trust/no trust approach of Java 1.1 or the fine grained approach of Java 1.2 as is conventionally known.

Transaction order interface 18 receives and communicates information messages between transaction destinations 12 and schedule manager 16. Transaction order interface 18 can be implemented in the Java programming language and runs on its own server. Transaction order interface 18 maintains a table of messages which are received from transaction destinations 12 and order manager 16 for translation purposes. Transaction order interface 18 accepts messages from one or more transaction destinations 12. and continuously translates them into messages that schedule manager 16 can process and retransmit them to order manager 16.

Accordingly, the applet running on the user's web browser (i.e. user interface 14) sends messages to and queries information from schedule manager 16 which is implemented on a dedicated web site. This dedicated web site in turn communicates with transaction destinations 12 using an established messaging protocol through transaction order interface 18. In this way, the user may communicate and transact with many different transaction destinations 12 via system 10 implemented on a dedicated web site. The user only needs to periodically connect to the dedicated web site to enter, modify and cancel schedules or to update the status of orders and obtain details completed transactions.

Figure 3:
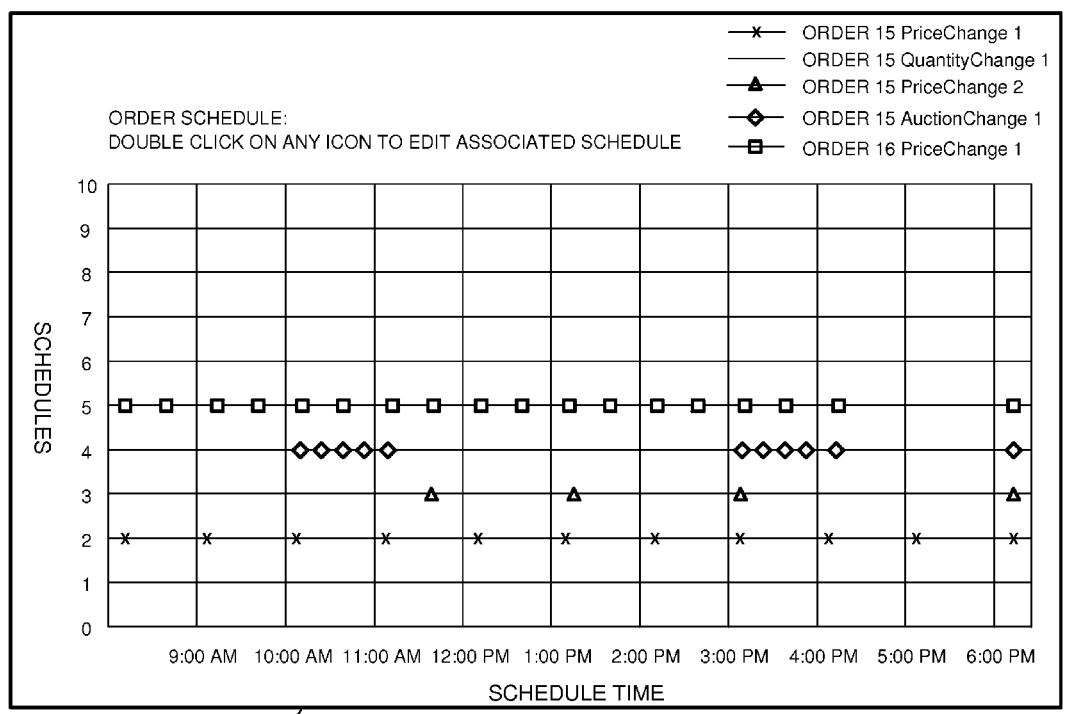
FIG. 3 is a sample screen showing a user specified order schedule as displayed by the user interface of FIG. 1.

FIG. 3 shows a sample user screen with a representation of a user order schedule 39. The order schedule 39 has the form of a two dimensional graph with the horizontal axis denoting time. A number of order characteristic plots are shown extending horizontally across the order schedule, each of which identifies a specific order characteristic. For example, the "Order15 PriceChange1" plot represents a user entered evaluation schedule for the order characteristic of price associated with Order 15.

It should be understood that users may have several order schedules co-pending. For example, one order may be a conventional security order which is based on conventional price and quantity order characteristics, another which may be an auction order which is based on auction related criterion such as an auction offer price, and. a third which is based on price and destination criterion only. System 10 can handle many different types and permutations of order characteristics including a variety of transaction destinations 12. For example, a user can schedule sending orders for selling oil while scheduling sending orders for buying securities. System 10 offers users flexibility in choosing exactly what order characteristics they wish to be evaluated for purposes of concluding a transaction using a full range of order characteristics or criteria (i.e. price, quantity, destination, etc.)

The markers on each order characteristic plot, indicates when that particular order characteristic is to be evaluated by schedule manager 16, according to a user-selected evaluation heuristic. It should be understood that each marker could be independently associated with a distinct user-selected evaluation heuristic, although for discussion purposes each order characteristic plot will be assumed to be associated with a single evaluation heuristic. The markers on the "Order15 PriceChange1" plot each represent when the user-specified heuristic (i.e. a heuristic used to change order price) associated with that plot is to be executed.

In reference to FIGS. 1 to 3, when an evaluation heuristic is executed by order manager 16, the results are entered into database server 32. If the evaluation heuristic is fulfilled, then on the subsequent query of the database server 32 by schedule supervisor server 38, an order message will be communicated to the appropriate transaction destination 12 through transaction order interface 18.

It is possible to have two plots (FIG. 3) running at the same time, each indicating when a different evaluation heuristic is to be executed for a certain order characteristic (i.e. price or quantity). For example, the "Order1SPriceChange1" and "Order15 PriceChange2" plots can be run together each triggering their own evaluation heuristics at the indicated marked times. System 10 can be designed so that if a time conflict occurs between two plots, the most recently entered plot prevails (i.e. the heuristic associated with the plot entered last by the user is evaluated).

In addition, transaction supervisor server 36 monitors orders that allow partial completion and adjusts orders within database server 32 by the amount transacted so that future scheduled adjustments operate on the remaining order quantity. For example, if 400 tons of rice out of 1000 tons originally entered have been purchased, then 600 tons will remain in the buy order stored in database server 32. As previously discussed, other order specifications within order schedule 39 can include the destination of the order, the treatment of a reduction in quantity either as a cancel/replace or as a modification of the former order (depending on the accepted queuing protocol of the transaction destination 12), and the rating of a counterparty as a criteria for accepting or rejecting a possible match where such information is disclosed by the transaction destination 12.

The sample order schedule 39 of FIG. 3 can be defined and manipulated by the user through the browser-based applet running at user interface 14. Order schedules 39 can be communicated by web server 32 through firewall server 30 to schedule supervisor server 38. This communication message is recognized by schedule superior server 38 as a database event and the transaction is stored by database server 32 and the list of order schedules to monitor is updated.

During general operation of system 10, schedule superior server 38 picks out order schedules 39 from database server 32 that need to be re-evaluated based on their time criteria (as defined within each order schedule 39 as previously explained), and processes each by determining the action to be taken and using a user pre-specified methodology to calculate the order characteristics to be entered or changed. The results are provided to database server 32 (i.e. any order modifications and new orders) and a message is sent to transaction order interface 18 to initiate, cancel or modify an order, if necessary.

The transaction supervisor server 36 identifies messages that are returned from transaction destinations 12 through transaction order interface 18. These messages provide details on the status of orders, specifically whether the order has been received, if it has been accepted, if it has been filled in part or in total, and data on the exchange environment (i.e. whether systems are functioning properly and if communications are still possible between the systems). Other messages include data produced by the transaction destinations 12 such as general information on other transactions that have been matched, or aggregate information on transaction information on transactions (i.e. transaction destinations 12 can also act as a data source for system 10).

Figure 4A:
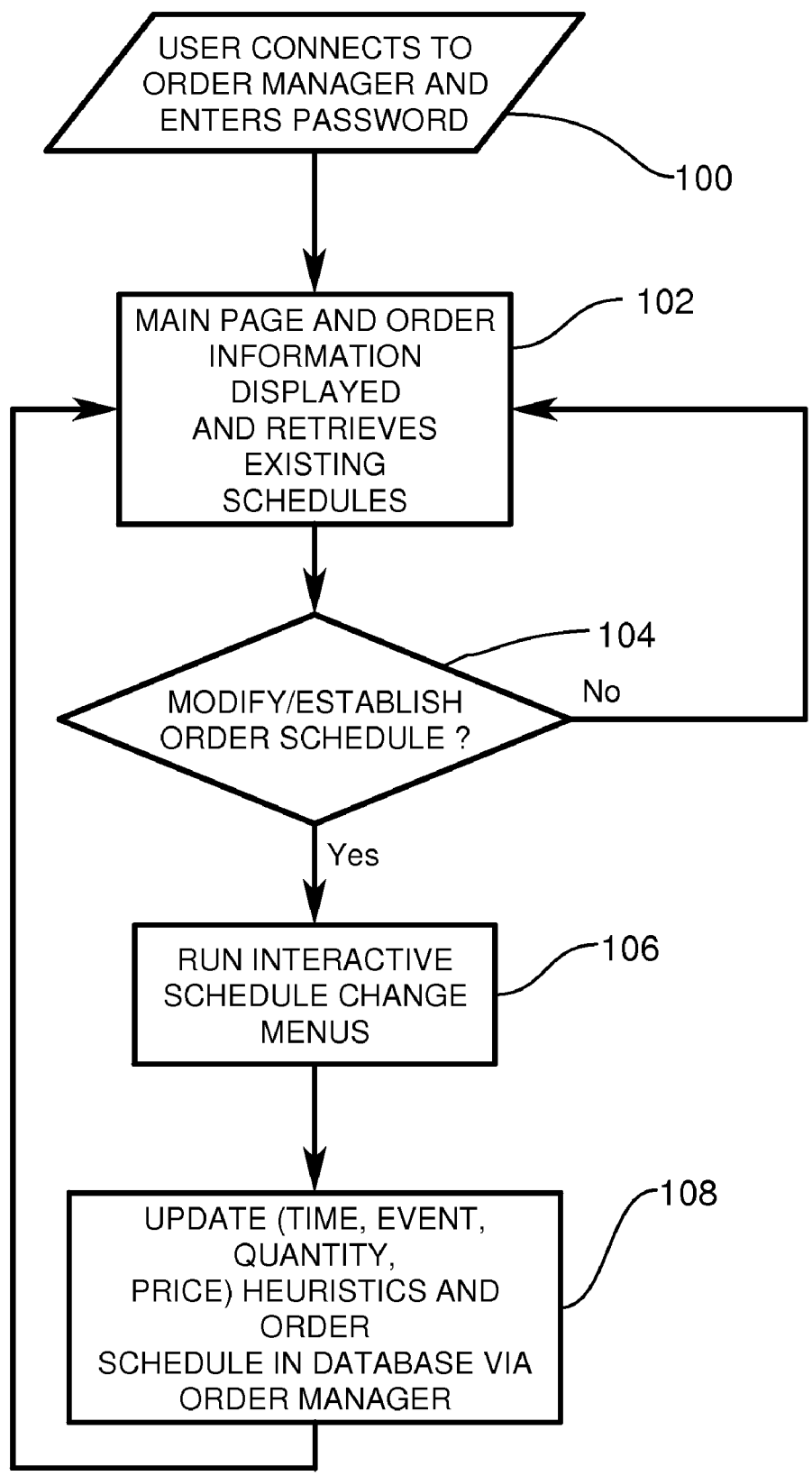
FIG. 4A is a flow chart diagram illustrating one embodiment of the process steps taken by the user applet of FIG. 1 to communicate order and schedule related information between the user and the order manager of FIG. 1.

Referring to FIGS. 1, 2 and 4A, the flow chart diagram (FIG. 4A) shows some of the steps of the routine used by the user applet of FIG. 1 to communicate order and schedule related information between the user interface 14 and order manager 16. For example, at step 100 user interface 14 is initiated by user using a prearranged login and password. At step 102, user interface 14 displays main page, current order information and a listing of existing order schedules for the user. At step 104, if the user wishes to modify or create an order schedule, user interface 14 will provide interactive menus to allow the user to enter the appropriate information and/or changes to existing order schedules. At step 108, user interface 14 sends the information to order manager 16 so that the user order schedules can be properly recorded in the database server 32.

Figure 4B:
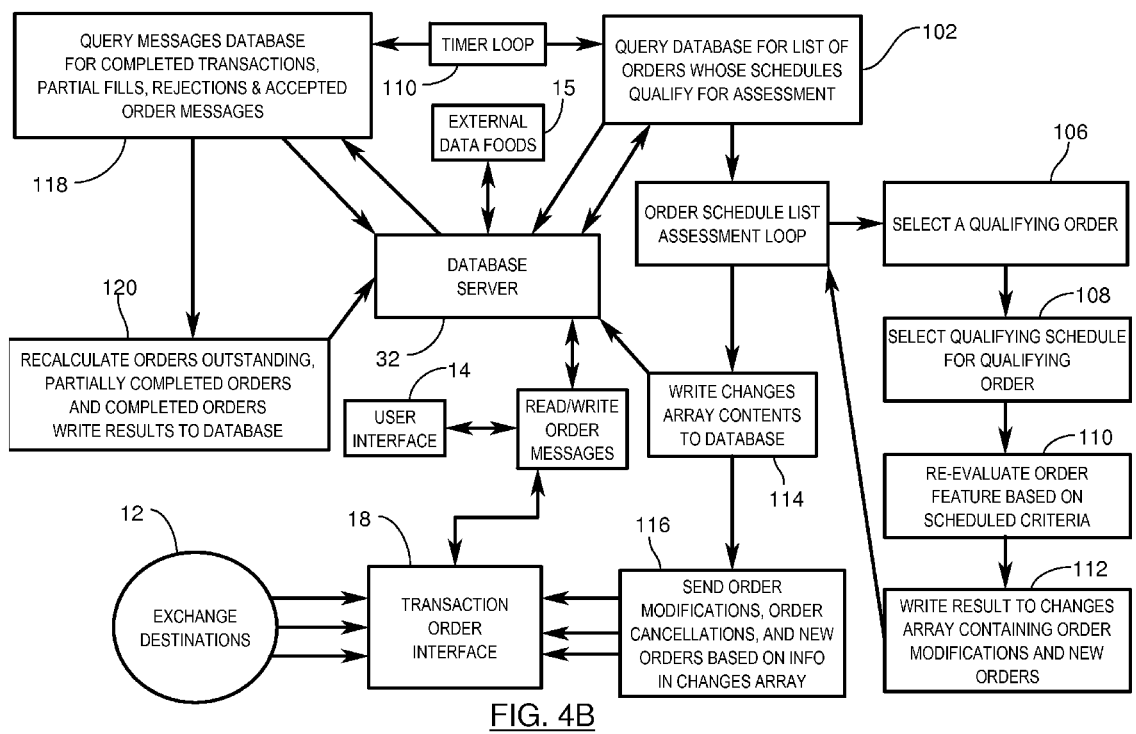
FIG. 4B is a flow chart diagram illustrating one embodiment of the process steps taken used by the order manager of FIG. 1 to monitor and update the order schedules.

Referring to FIGS. 1, 2, and 4B, the flow chart diagram (FIG. 4B) illustrates one embodiment of the routine used by the order manager of FIG. 1 to monitor and update the order schedules. Specifically, at step 110, a timer loop is shown which is used to clock both the activity of the schedule supervisor server 38 as well as the transaction supervisor server 36.

The schedule supervisor server 38 implements steps 102 to 116 as follows. At step 102, schedule supervisor server 38 queries database server 32 for a list of orders whose schedules qualify for evaluation according to the stored list of order schedules. At step 104, the various orders are evaluated in turn within an assessment loop until all of the orders have been evaluated. The evaluation loop begins with step 106 where a qualifying order is selected.

At step 108 the qualifying order schedule is selected for that order and at step 110 all the associated plots listed in the schedule are evaluated according to the evaluation heuristics associated with each marker, as discussed above. As previously discussed, for simplicity, each order plot is associated with a single evaluation heuristic, although it would also be possible to associate a separate evaluation heuristic with each individual marker within a plot. At step 112, the results of the evaluation are written into a changes array (i.e. temporary storage), including order modifications and new orders that have been generated due to changing variables. This loop is repeated until all qualifying orders have been processed as discussed above.

At step 114, all the values stored in the changes array are written to database server 32. Finally at step 116, order modifications, order cancellations and orders activations are sent to transaction destinations 12 through transaction order interface 18, as explained above.

The transaction supervisor server 36 of order manager 16 monitors the state of orders which are sent from transaction destinations 12 through transaction order interface 18 to database server 32 in steps 118 and 120. At step 118, transaction supervisor server 36 queries database server-32 for messages relating to completed transactions, partial fills, rejections and accepted order messages. At step 120, transaction supervisor server 36 recalculates outstanding orders, partially completed orders and completed orders and sends the updated results to database server 32. Other information such as whether various exchange systems are functioning properly and whether communication links are active can also be monitored and used by system 10 to efficiently process orders with available transaction destinations 12.

Figure 4C:
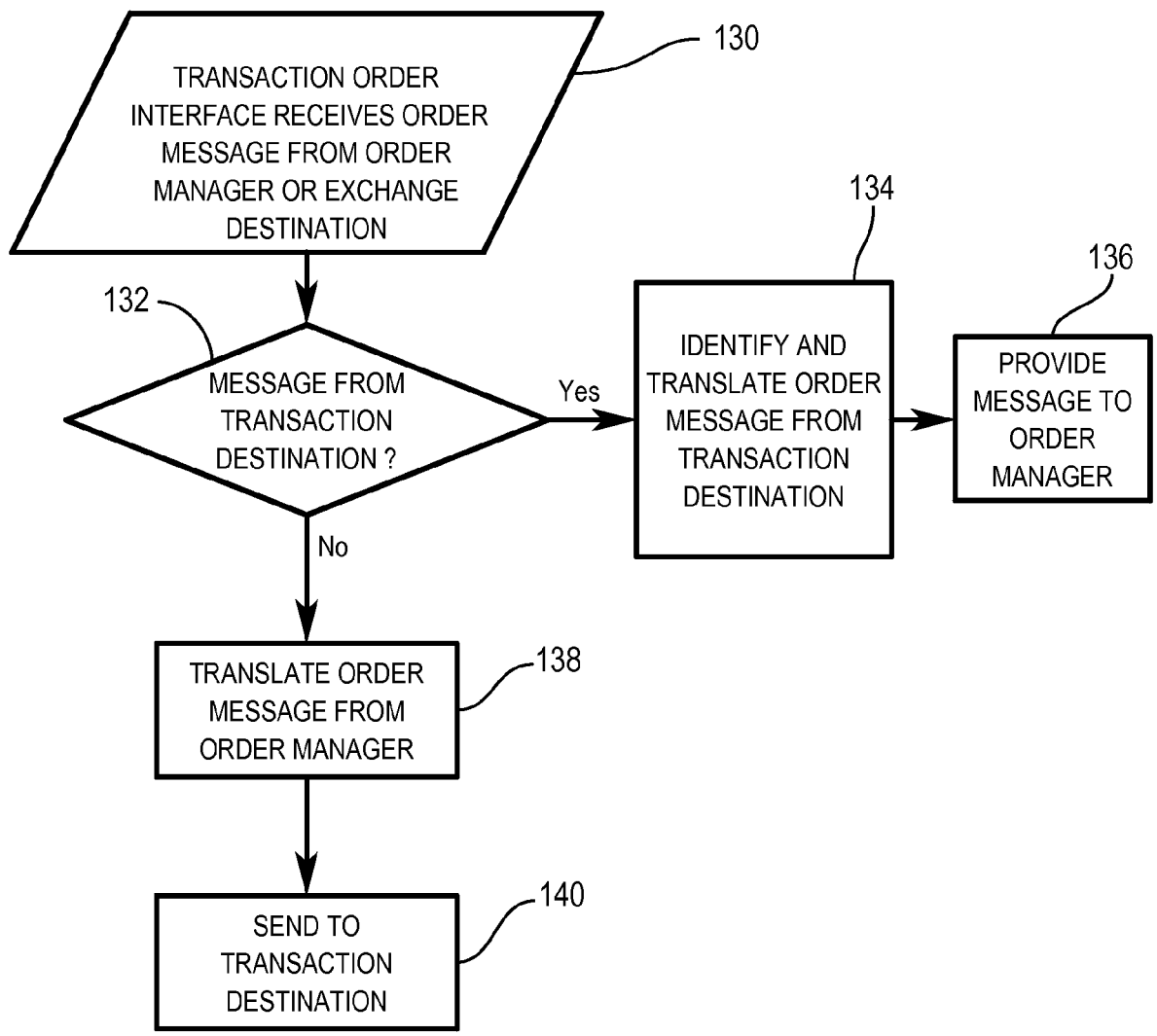
FIG. 4C is a flow chart diagram illustrating one embodiment of the process steps taken by the exchange order interface of FIG. 1 to receive and translate order messages between the transaction destinations and the order manager.

Referring to FIGS. 1, 2 and 4C, the flow chart diagram (FIG. 4C) illustrating one embodiment of the process used by the transaction order interface 18 of FIG. 1 to receive and translate order messages between the transaction destinations and the order manager. At step 130, transaction order interface 18 receives order messages from order manager 16 or transaction destination 12. At step 132, if the message from transaction destination 12 then at step 134, the message is identified and translated and provided at step 136 to order manager 16. Otherwise, the order message is translated at step 138 into a form which can be processed by the transaction destination 12 at step 140.

Referring generally to FIGS. 1 to 4C, as previously discussed, a user-selected heuristic is evaluated at each marker point on particular order characteristic plot for an order schedule 39. It should be understood that a wide range of different types of evaluation heuristics can be preselected for execution and can include information that is known within system 10 (e.g. prior price of an order), information that is known within the transaction destination 12 (e.g. prior trade of the same type of item on the same exchange system), as well as other external data sources (e.g. interest rates). Typically, each methodology uses one or several datafeed inputs (from external information sources such as weather stations or the like), one or more weights, and one or more user specific spread quantities.

One example evaluation heuristic which would be executed to implement a static table of prices at which a user was willing to sell over a period of time, with each amount being initiated at different points on the schedule. This evaluation heuristic would be useful for a user who wishes to set the price of a plant growth enzyme at progressively higher prices each week of the growing season.

Another example evaluation heuristic could be where the offer price or quantity is derived by multiplying a predetermined weight W1 by an generalized index value. A generalized index value can be provided by a preselected data source for a particular item in a particular field of operation, which can be represented by index (datasource, item, field). That is, the evaluation heuristic could evaluate the relation:

$$W_1 * \text{index}(\text{datasource, item, field})$$

For example, if a user wished to sell 50 megawatts hours of electricity for five days starting at 12:00:01 am Jun. 8, 2001, the offer price could be calculated using the relation discussed above, where W1 is 100.17% and index (datasource, item, field) is the current bid price. Consequently, the offer price would be 100.17% of the current bid price.

Another example evaluation heuristic could be where the offer price or quantity is derived by multiplying a constant weight W1 by a generalized index value and adding the result to another constant weight W2. That is, the evaluation heuristic could evaluate the relation:

$$W_2 + (W_1 * \text{index}(\text{datasource, item, field}))$$

For example, an order price for 200 memory chipcards, Wintel compatible, 14 pin of 64 meg size at a price per chipcard could be calculated using the above relation where W2 is a constant dollar amount, W1 is a certain percentage value, and index (datasource, item, field) is set to be the price of 128 meg memory chipcards, Wintel compatible, 14 pin.

Another example evaluation heuristic could be where the offer price or quantity is derived by combining a number of constant values with a number of generalized indexes. For example, the evaluation heuristic could evaluate the relation:

$$W_1 + (\text{index}_1(\text{datasource, item, field})) + (W_2 * (\text{index}_2(\text{datasource, item, field})) * \% \text{ change in index}_3(\text{datasource, item, field}))$$

For example, an order price for one million dollars of home insurance could be derived using the above relation where $W_1$ is \$18.95, indexi(datasource, item, field) is a base home insurance rate, $W_2$ is 1, $\text{index}_2$(datasource, item, field) is the price for the same product quoted a year ago, and index3 is the temperature of the ocean surface and the % change of the temperature is calculated over a period of a year.

Another example evaluation heuristic could be where the offer price or quantity is derived by combining a number of constant values with a number of generalized indexes. For example, the evaluation heuristic could evaluate the relation:

$$W_1 + W_2(\text{index}_1(\text{datasource, item, field})) + (W_3 * (\text{index}_2(\text{datasource, item, field})) * \% \text{ change in index}_3(\text{datasource, 10 item, field}))$$

For example, an order price for one million dollars of home insurance could be derived using the above relation where $W_1$ is \$18.95, $\text{index}_1$(datasource, item, field) is a base home insurance rate, $W_2$ is 95%, $\text{index}_2$(datasource, item, field) is the price for the same product quoted a year ago, and $\text{index}_3$ is the temperature of the ocean surface and the % change of the temperature is calculated over a period of a year and $W_3$ is 110%.

Finally, another example evaluation heuristic wherein the offer price or quantity is derived using case based criteria combining a number of constant values with a number of generalized indexes. For example, the evaluation heuristic could evaluate the relation:

if condition 1 is true then calculation 1 if condition 2 is true then calculation 2 if condition 3 is true then calculation 3, where calculation 1, 2, 3 can be any of the evaluation heuristics discussed above. An example of use would be where offer loans (with same yield and same tranche sizes) but credit grade equals the prior month standard grade less one grade if total loans generated in the third quarter are less than 40 million.

These evaluation heuristics can be used to determine the specific value of an order characteristic for order price, order quantity, as well as an order satisfaction density profiles (as disclosed in U.S. Pat. No. 5,845,266 to Lupien et al.) which combines price and quantity, rule based numeric thresholds or standards, choice of transaction destination (i.e. an auction site or order matching system), segmentation of an aggregate order between multiple destinations, means of delivery, quality standards, credit standards, as well as many other conventional transaction related or financial instrument or commodity related characteristics.

In use, a user will connect to system 10 using a conventional web browser and establish a number of order schedules as well as the particular evaluation heuristics that are desired to be executed at the various marker points (i.e. at specific times) specified in the order schedule. Once the order schedules and associated evaluation heuristics are established by the user and recorded within database server 32 of schedule manager 16, system 10 will proceed to check and calculate on a timed basis according to the order schedule.

System 10 will provide users with order schedules in a steady state when all existing schedules have been evaluated, and all orders reassessed based on reported, completed transactions. At such a time, there will exist a potential group of unfilled buy schedules and a potential group of unfilled sell schedules for each subject instrument, but no opposite orders being concurrently active and transactable, having the same exchange system destination specified and overlapping prices.

System 10 allows users to specify the ways that various terms and conditions (i.e. specific valuations of order characteristics) at which they are willing to transact may change over time in an automated fashion while still retaining the ability to intervene at any time. The impact of such a system 10 is that users will not have to constantly adjust their orders but will be able to plan their attitudes towards the items to be transacted over time in advance using the order schedules and associated transaction evaluation heuristic. System 10 will allow users to improve their transaction satisfaction and matching results based on the criteria of time, composition of fills, relative price as well as price and quantity.

It should be understood that several different architectures can be used to implement system 10. Specifically, FIG. 5A shows an alternative implementation for system 10, whereby the user interface 14 sends messages to and queries information from transaction destinations 12 via the schedule manager 16 which is hosted on a web server associated with each transaction destination 12. In this case, schedule manager 16 operates at the web server of the transaction destination 12 according to the order schedules entered by the user through user interface 14.

Figure 5B:
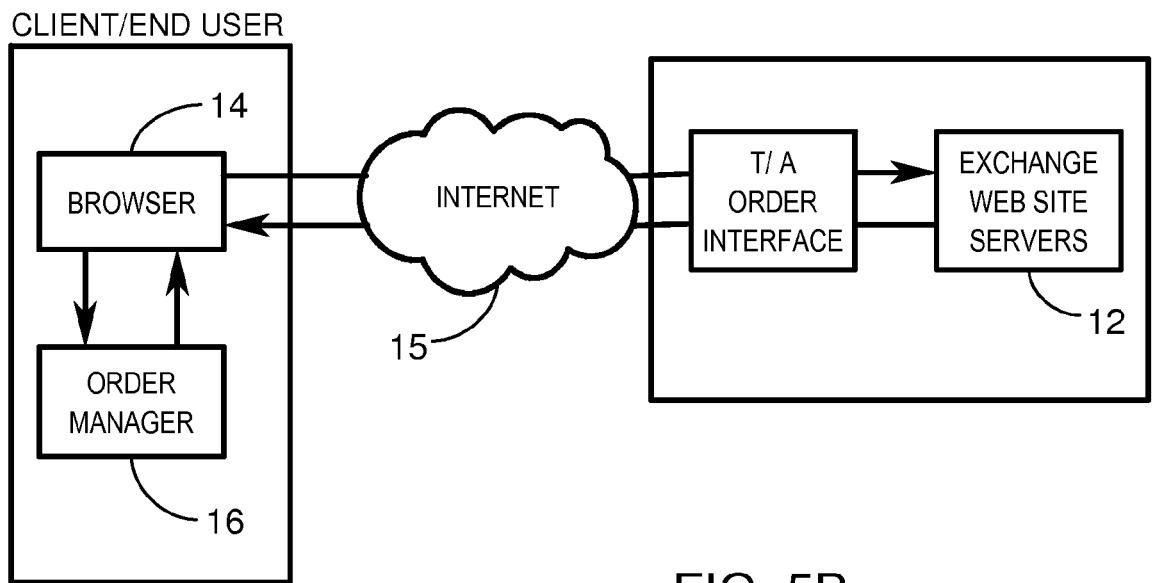
FIG. 5B is a schematic drawing of an alternative embodiment of the order matching system of FIG. 1.
Figure 5A:
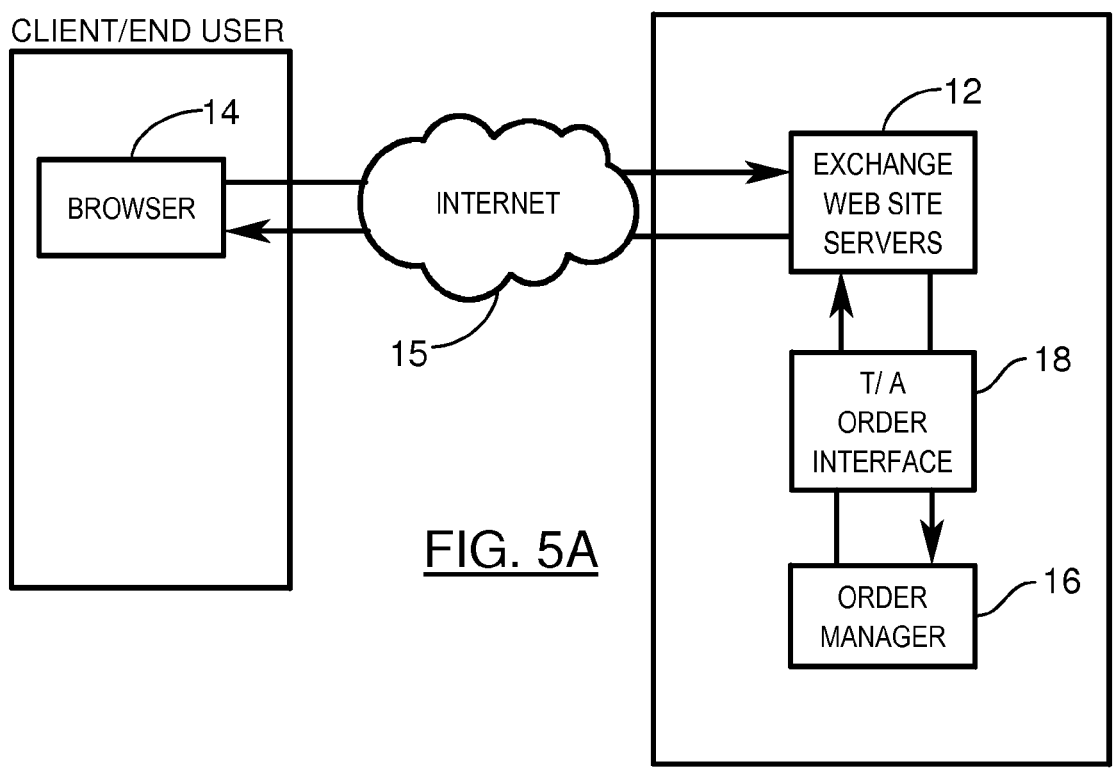
FIG. 5A is a schematic drawing of an alternative embodiment of the order matching system of FIG. 1.

FIG. 5B shows an alternative implementation for system 10, whereby the user interface 14 and schedule manager 16 are combined to run together on the user's desktop browser software. All communications are carried out with the transaction destinations 12 using a standardized messaging protocol or by integrating the transaction order interface 18 into the user's software system. In such a case, it is necessary for the user's browser to remain open in order to transmit and receive messages for controlling and managing orders as stipulated by the order schedules. It should be understood that it is possible for the user to specify that various transaction destinations may be chosen to transact with.

System 10 can be easily tailored to comply with the rules of any specific computerized transaction systems for entering, terminating and adjusting orders. For instance, some transactions systems permit an order's quantity to be reduced without losing its place (priority) in the transaction system's queue, instead of cancelling and entering a revised order which process loses any priority standing. The former approach is optimal and can be accommodated by system 10 and implemented where permitted.

System 10 can also easily handle "baskets" of orders. For example, if the user wishes to sell 10 used PalmPilotV's on an English/Dutch auction type web site such as eBay.com and to buy 10 new PalmPilotVII's in a collective bidding arrangement at a web site such as mercata.com, the participant would create a buy schedule for the PalmPilotVII's and a sell schedule for the PalmPilotV's and indicate that these schedules are to be linked together such that the sell bid can be automatically activated if notification is received electronically that the PalmPilotV offer has been accepted by another participant.

Such a linking process can be accomplished by arranging a secure, encrypted message to be transmitted over the internet from the "eBay/English or Dutch auction type" web site back to the system on the site that the user connects to. This notification would cause the sell schedule to be reevaluated now that it has been filled or partially filled and during this evaluation the linkage flag would initiate reevaluation of the buy order schedule. The reevaluation of the buy order schedule would initiate the buy order or part of the buy order depending on how the link is configured.

As will be apparent to those skilled in the art, various modifications and adaptations of the method and system described above are possible without departing from the present invention, the scope of which is defined in the appended claims.

The invention claimed is:

1. A method, comprising:
   receiving, via a communications network, a definition of an order, defined by an evaluation heuristic, that identifies changes of respective characteristics of transaction instances of the order at respective execution times of the transaction instances;
   transmitting, via the communications network, a message defining a transaction instance of the transaction instances to a transaction destination of the transaction instance;
   receiving, via the communications network, a completion message identifying a status of the transaction instance from the transaction destination.

2. The method according to claim 1, wherein the receiving the completion message comprises updating the definition of the order according to the status yielding an updated definition, and wherein the transmitting the message comprises generating an updated message defining an updated transaction instance based on the updated definition.

3. The method according to claim 2, further comprising identifying an incomplete order, and wherein the defining the updated transaction instance includes cancelling the transaction instance or revising the transaction instance.

4. The method according to claim 3, wherein the revising the transaction instance comprises revising the transaction destination.

5. The method according to claim 3, wherein the transmitting the message includes transmitting message data identifying a price and a quantity, and wherein the defining the updated transaction instance comprises revising at least one of the price or the quantity.

6. The method according to claim 4, wherein the transmitting the message to the transaction destination comprises transmitting the message to a liquidity destination.

7. The method according to claim 5, wherein the transmitting the message to the transaction destination comprises transmitting the message to a liquidity destination.

8. The method of claim 1, wherein receiving the definition of the order further includes receiving the definition based on a table of prices associated with the execution times.

9. The method of claim 1, wherein receiving the definition of the order further includes receiving the definition based on changes of a price of respective transaction instances or changes of a quantity of the respective transaction instances.

10. A system, comprising:
at least one processor;
at least one memory communicatively coupled to the at least one processor, the at least memory having stored therein instructions, comprising:
a data storage component configured to store a definition of an order schedule, defined by an evaluation heuristic, identifying changes of respective characteristics of orders of the order schedule at respective execution times of the orders;
a schedule manager component configured to communicate, based on the evaluation heuristic, a message defining an order of the orders to a destination; and
an order manager component configured to receive a completion message identifying a status of the order from the destination.

11. The system according to claim 10, wherein the order manager component is further configured to update the definition of the order schedule based on the status, and wherein the schedule manager component is further configured to generate an updated order message defining an updated order based on the updated definition.

12. The system according to claim 11, wherein the status identifies an incomplete order, and the updated order comprises at least one of a canceled order or a revised order.

13. The system according to claim 12, wherein the revised order comprises a revised transaction destination.

14. The system according to claim 12, wherein the message identifies a price and a quantity, and the revised order comprises at least one of a revised price or a revised quantity.

15. The system according to claim 13, wherein the message identifies a price and a quantity, and the revised order comprises at least one of a revised price or a revised quantity.

16. The system of claim 10, wherein a characteristic of the characteristics is a price or a quantity.

17. A system, comprising:
means for storing a definition of an order schedule identifying, based on an evaluation heuristic, changes of respective characteristics of transactions of the order schedule at respective execution times of the transactions;
means for transmitting, based on the evaluation heuristic, an order message defining a transaction of the transactions to a transaction destination; and
means for receiving, from the transaction destination, a completion message identifying a completion status of the transaction.

18. The system according to claim 17, wherein the means for receiving the completion message further comprises means for updating the definition of the order schedule to obtain an updated order schedule based on the completion status; and wherein the means for transmitting the order message further comprises means for generating an updated order message defining an updated transaction according to the updated order schedule.

19. The system according to claim 18, wherein the completion status identifies an incomplete transaction, and the updated order schedule comprises a canceled transaction or a revised transaction.

20. The system according to claim 19, wherein the revised transaction comprises a revised transaction destination.

21. The system according to claim 19, wherein the order message identifies a price and a quantity, and the revised transaction comprises a revision to at least one of the price or the quantity.

22. The system according to claim 20, wherein the order message identifies a price and a quantity, and the revised transaction comprises a revision to at least one of the price or the quantity.

23. A computer-readable medium including computer-executable instructions that, in response to execution by a computing device, cause the computing device to perform operations comprising:
receiving a definition associated with an evaluation heuristic specifying changes of respective parameters of transactions at respective execution times of the transactions;
transmitting, based on the evaluation heuristic, an order message defining a transaction of the transactions to a destination; and
receiving, from the destination, a completion message identifying a completion status of the transaction.

24. The non-transitory computer-readable medium according to claim 23, wherein the receiving the completion message comprises updating the definition in accordance with the completion status yielding an updated definition, and wherein the transmitting the order message comprises generating an updated order message defining an updated transaction based on the updated definition.

25. The non-transitory computer-readable medium according to claim 24, wherein the receiving the completion message includes receiving message data identifying a status identifying an incomplete transaction, and wherein the defining the updated transaction comprises cancelling the transaction or revising the transaction.

26. The non-transitory computer-readable medium according to claim 25, wherein the revising the transaction includes revising the transaction destination.

27. The non-transitory computer-readable medium according to claim 25, wherein the defining the transaction includes identifying a price and a quantity, and wherein the revising the transaction includes revising at least one of the price or the quantity.

28. The non-transitory computer-readable medium according to claim 26, wherein the defining the transaction includes identifying a price and a quantity, and wherein the revising the transaction includes revising at least one of the price or the quantity.

* * * * *

UNITED STATES PATENT AND TRADEMARK OFFICE
CERTIFICATE OF CORRECTION

PATENT NO.         : 8,108,294 B2
APPLICATION NO.    : 12/719537
DATED              : January 31, 2012
INVENTOR(S)        : Marks De Chabris et al.

Page 1 of 1

It is certified that error appears in the above-identified patent and that said Letters Patent is hereby corrected as shown below:

Title page, item (57), under "Abstract", in Column 2, Line 11, delete "and to update" and insert -- and update --.

Column 1, line 2, below "Title" insert -- CROSS-REFERENCE TO RELATED APPLICATIONS --.

Column 11, line 21, in Claim 10, delete "the at least memory" and insert -- the at least one memory --.

Signed and Sealed this
Twenty-ninth Day of January, 2013

David J. Kappos
*Director of the United States Patent and Trademark Office*